United States Patent
Burnett et al.

(10) Patent No.: US 10,467,420 B2
(45) Date of Patent: *Nov. 5, 2019

(54) SYSTEMS FOR EMBEDDING INFORMATION IN DATA STRINGS

(71) Applicant: MICRO FOCUS LLC, Santa Clara, CA (US)

(72) Inventors: Steven D. Burnett, Millbrae, CA (US); Terence Spies, Mountain View, CA (US); Luther W. Martin, San Jose, CA (US); Robert K. Vaterlaus, Oakland, CA (US); Matthew J. Pauker, San Francisco, CA (US)

(73) Assignee: Micro Focus LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/609,094

(22) Filed: Jan. 29, 2015

(65) Prior Publication Data

US 2015/0143133 A1    May 21, 2015

Related U.S. Application Data

(63) Continuation of application No. 12/435,635, filed on May 5, 2009, now Pat. No. 8,948,375.

(51) Int. Cl.
*G06F 21/60* (2013.01)
*G06F 21/62* (2013.01)
*H04L 9/08* (2006.01)

(52) U.S. Cl.
CPC ........ *G06F 21/602* (2013.01); *G06F 21/6209* (2013.01); *G06F 21/6227* (2013.01);
(Continued)

(58) Field of Classification Search
CPC .............. G06F 21/602; G06F 21/6245; G06F 21/6227; G06F 21/6209; H04L 9/0816; H04L 2209/24

See application file for complete search history.

(56) References Cited

U.S. PATENT DOCUMENTS 5,499,293 A    3/1996    Behram et al.
6,836,765 B1    12/2004    Sussman
(Continued)

FOREIGN PATENT DOCUMENTS

EP    1 209 550    5/2002
EP    1909212    * 10/2007    ............ G06F 21/24
(Continued)

OTHER PUBLICATIONS

Shikha Gupta et al., "Format Preserving Encryption Technique to Strengthen Data Warehouse Security," Aug. 2014, pp. 171-175. (Year: 2014).*

(Continued)

*Primary Examiner* — Luu T Pham
*Assistant Examiner* — Canh Le

(57) ABSTRACT

A data processing system is provided that includes applications, databases, encryption engines, and decryption engines. Encryption and decryption engines may be used to perform format-preserving encryption on data strings stored in a database. Applications may be used to embed information in data strings. Information may be embedded by using a character set that is larger than a character set being used by a data string. A data string may be converted into a larger character set, analogous to converting a number from a lower base to higher base. Such a conversion may shorten a data string, allowing information to be embedded as appended characters.

18 Claims, 14 Drawing Sheets

(52) U.S. Cl.
CPC ........ *G06F 21/6245* (2013.01); *H04L 9/0816* (2013.01); *H04L 2209/24* (2013.01)

(56) References Cited

U.S. PATENT DOCUMENTS

| | | | |
|---|---|---|---|
| 6,885,748 | B1 | 4/2005 | Wang |
| 7,418,098 | B1* | 8/2008 | Mattsson ............ H04L 9/0637 380/28 |
| 7,567,934 | B2 | 7/2009 | Flitcroft et al. |
| 7,665,015 | B2 | 2/2010 | Dignum et al. |
| 7,738,717 | B1* | 6/2010 | Palmer ................ H03M 7/30 382/245 |
| 7,864,952 | B2 | 1/2011 | Pauker et al. |
| 8,208,627 | B2 | 6/2012 | Pauker et al. |
| 8,355,982 | B2 | 1/2013 | Hazel et al. |
| 8,938,067 | B2 | 1/2015 | Martin et al. |
| 2003/0028481 | A1* | 2/2003 | Flitcroft ............... G06Q 20/00 705/39 |
| 2003/0191719 | A1 | 10/2003 | Ginter et al. |
| 2005/0132070 | A1 | 6/2005 | Redlich et al. |
| 2008/0170693 | A1* | 7/2008 | Spies ................ G06F 21/6209 380/277 |
| 2009/0048953 | A1 | 2/2009 | Hazel et al. |
| 2009/0060199 | A1 | 3/2009 | von Mueller et al. |
| 2009/0070583 | A1 | 3/2009 | von Mueller et al. |
| 2009/0310778 | A1 | 12/2009 | Mueller et al. |
| 2010/0008500 | A1* | 1/2010 | Lisanke ................ G06F 21/10 380/201 |
| 2010/0246813 | A1 | 9/2010 | Morris et al. |
| 2011/0211689 | A1 | 9/2011 | von Mueller et al. |
| 2013/0198525 | A1 | 8/2013 | Spies et al. |
| 2013/0254117 | A1 | 9/2013 | von Mueller et al. |

FOREIGN PATENT DOCUMENTS

| | | |
|---|---|---|
| EP | 1 906 336 | 4/2008 |
| EP | 1 909 212 | 4/2008 |
| WO | 2006/107777 | 10/2006 |

OTHER PUBLICATIONS

Terence Spies, "Format Preserving Encryption," Jul. 4, 2009, pp. 1-8. (Year: 2009).*

Thomas Stutz and Andreas Uhl, "On Format-Compliant Iterative Encryption of JPEG2000," Proceedings of the Eighth IEEE International Symposium on Multimedia (ISM '06), 2006.

J. Black and P. Rogaway, "Ciphers with Arbitrary Finite Domains," [online]. Feb. 12, 2001 <URL:eprint.iacr.org/2001/012.ps>.

Brightwell, Michael et al., "Using Datatype-Preserving Encryption to Enhance Data Warehouse Security," 20th National Information Systems Security Conference, Oct. 7-10, 1997—Baltimore, Maryland.

Black, John et al. "Ciphers with Arbitrary Finite Domains," RSA Conference 2002, San Jose, CA, USA, Feb. 18-22, 2002, Proceedings, "Lecture Notes in Computer Science," 2271 Springer 2002, ISBN 3-540-43224-8, pp. 114-130.

Terence Spies. "Format Preserving Encryption," Jul. 4, 2009, pp. 1-8.

Mihir Bellare et al., "Format-Preserving Encryption." Selected Area in Cryptography, Lecture Notes in Computer Science vol. 5867, 2009, pp. 259-312.

* cited by examiner

| CUSTOMER NAME | ADDRESS | CREDIT CARD NO. | SOCIAL SECURITY NO. |
|---|---|---|---|
| CUSTOMER1 | ADDRESS1 | CCNUMBER1 | SSN1 |
| CUSTOMER2 | ADDRESS2 | CCNUMBER2 | SSN2 |
| CUSTOMER3 | ADDRESS3 | CCNUMBER3 | SSN3 |
| ⋮ | ⋮ | ⋮ | ⋮ |

FIG. 2

| 0 | 1 | 2 | 3 | 4 | 5 | 6 | 7 | 8 | 9 |
|---|---|---|---|---|---|---|---|---|---|
| A | B | C | D | E | F | G | H | I | J |
| K | L | M | N | O | P | Q | R | S | T |

FIG. 5

SYSTEMS FOR EMBEDDING INFORMATION IN DATA STRINGS

This patent application is a continuation of patent application Ser. No. 12/435,635 filed May 5, 2009, which is hereby incorporated by reference herein in its entirety. This application claims the benefit of and claims priority to patent application Ser. No. 12/435,635 filed May 5, 2009.

BACKGROUND OF THE INVENTION

This invention relates to data strings, and more particularly, to encrypting and embedding information in data strings.

Databases are often used to store data that is accessed by applications. As applications access and process data from a database, it may become necessary for applications to store additional information in a database. For example, a cryptographic application may need to store information about cryptographic keys in a database containing data that to be encrypted. However, it can be difficult to add additional data fields to an existing database. For example, if a database is used to store medical records for an insurance company or credit card account information for a bank, it can be impractical to alter or add database fields while the database is being accessed in the course of daily operations.

It would therefore be desirable to provide a method for embedding information in data strings stored in a database without requiring significant modifications to the database.

SUMMARY OF THE INVENTION

In accordance with the present invention, a data processing system is provided that includes applications and databases. The applications and databases handle data. The data includes data strings containing characters.

Each data string may have an associated data string type that specifies a legal set of characters for the data string. Each data string may also have a data format that specifies a subset of the legal set of characters. For example, a data string storing a number such as an identification number may use a character set of numerical characters. Such a data string may actually have a data type that allows letters and special characters in addition to numerical characters. The unused characters (letters and special characters in this example) may be used for embedding information in the data string.

Information may be embedded in a data string by recoding a data string from its original data format to a new data format that uses larger set of legal characters. The larger set of characters enables the data string to store embedded information without irreversibly obscuring the original data string contents.

Embedding information in data strings may be particularly useful when format-preserving encryption is used to encrypt data strings. Format-preserving encryption and decryption engines are provided that may be used to encrypt individual data strings without altering their original data formats. After encryption, information such as a version number for the encryption process can be embedded in an encrypted data string. This allows an encryption engine to store encryption-related information in a database without having to add data fields or make modifications to the database.

Further features of the invention, its nature and various advantages will be more apparent from the accompanying drawings and the following detailed description of the preferred embodiments.

BRIEF DESCRIPTION OF THE DRAWINGS

FIG. 2 is a diagram of an illustrative database table showing data strings that may be individually encrypted and augmented with embedded information in accordance with an embodiment of the present invention.

FIG. 5 is a table showing how characters in an original character set may be mapped to characters in a larger character set in accordance with an embodiment of the present invention.

DETAILED DESCRIPTION OF THE PREFERRED EMBODIMENTS

Figure 1:
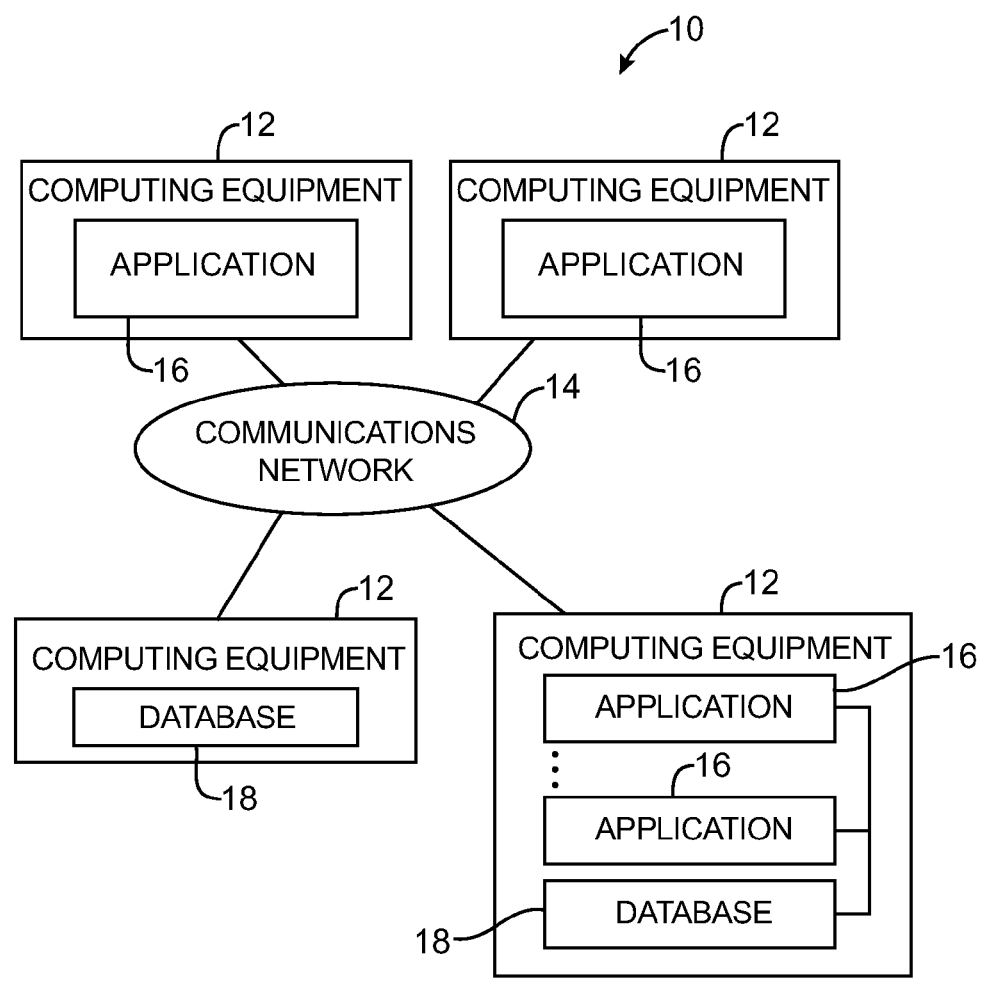
FIG. 1 is a diagram of an illustrative system environment containing databases and applications in accordance with an embodiment of the present invention.

An illustrative computing system 10 that may be used to implement data processing functions in accordance with the present invention is shown in FIG. 1. System 10 includes computing equipment 12 and communications network 14. The computing equipment 12 may include one or more personal computers, workstations, computers configured as servers, mainframe computers, portable computers, etc. Computing equipment 12 may include processing circuitry, displays, input-output devices, and storage (e.g., hard drives, volatile memory, non-volatile memory, and other storage media) that can run code for system 10. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, etc.

The data handled by the applications 16 and databases 18 of system 10 is represented digitally. The data includes strings of characters (i.e., names, addresses, account numbers, etc.). Consider, as an example, a scenario in which a credit card company maintains a database of credit card data for its customers. An illustrative database table 24 that might be associated with this type of database is shown in FIG. 2. As shown in FIG. 2, table 24 has four columns. The first column is used to store customer names. The second column of table 24 is used to store corresponding customer addresses. The third column and fourth column are used to store credit card numbers and social security card numbers, respectively. Each row of table 24 corresponds to a different customer. An application that desires to retrieve the social security number of the fourth customer in table 24 (as an example), retrieves the social security number from the social security number field that is associated with the fourth row of table 24.

The data strings that are handled in a typical data processing system have defined formats. For example, an identification number may be made up of a letter followed by two digits. The customer name field may contain 20 characters. Valid characters in the customer name field may be restricted to uppercase and lowercase letters and certain punctuation characters. The address field may contain 100 characters. Valid address field characters may be restricted to uppercase and lowercase letters, numbers, and certain punctuation characters. The social security number fields may be populated by strings of nine digits. The digits may be restricted to certain ranges and be separated by dashes.

In some cases, a data format may use a character set that is a subset of a character set allowed by a data string. For example, a data format might be a social security number data having only numerical characters, while a data string may allow numerical characters, letters, and special characters. For example, a database that is programmed in SQL (structured query language) may have data strings of type VARCHAR. Data strings of type VARCHAR can have characters that are letters, numbers, or special characters. Numerical characters are therefore a subset of the allowed VARCHAR characters. When a data string of type VARCHAR is used to store numerical characters such as social security numbers, only a subset of characters allowed by type VARCHAR will generally be needed to store the unmodified social security number data.

If a data string uses a character set (e.g., numerical characters) that is a subset of characters allowed by the data type (e.g., when using numerical characters which are a subset of the character set made up of numerical characters, letters and special characters), then the larger set of characters (e.g., numerical characters, letters, and special characters) may be used to represent the data string when embedding information in the data string. The embedded information may be any information added to the content of a data string in addition to its original data. Original data may be, e.g., social security numbers, license numbers, account information, or any data originally stored in a data string. A data string that has been processed so that it contains both its original data and embedded data may be referred to as an augmented data string.

The processes involved in embedding information in data strings by data string augmentation may be performed by computing equipment 12 and applications 16 in system 10 (see, e.g., FIG. 1). Applications 16 may embed information in data strings of databases 18. An application 16 running on computing equipment 12 may embed information in a database 18 that is located on the same computing equipment 12. An application 16 may also use communications network 14 to embed information a database 12 that is located on different computing equipment 12. If desired, data string augmentation may involve the use of encryption and decryption engines. These engines may be a part of applications 16.

An application 16 that embeds information in a data string may later retrieve the information from the augmented data string. For example, an application 16 that accesses a database 18 may generate information that is associated with individual data strings in the database 18. It may be difficult or inconvenient to add fields or otherwise modify database 18 to customize database 18 to each application 16. In such cases, it would be useful to be able to embed information in data strings. An application 16 may also embed information that is later retrieved by a different application 16.

The process of embedding information in data strings may be used in conjunction with format-preserving encryption. Format-preserving encryption can encrypt individual data strings so that encrypted data strings have the same data format as the original data strings. For example, a social security number data string may have a data format of nine numerical characters with two dashes interposed between the numerical characters. Format-preserving encryption may produce an encrypted data string with the same data format (i.e. nine numerical characters with two interposed dashes). A credit card number may have groups of four numerical characters separated by spaces. Format-preserving encryption may produce an encrypted credit card number data string with groups of four numerical characters separated by spaces. A license plate number may have a format of a number, three letters, and four numbers such as "3WIG892". Format-preserving encryption may produce an encrypted license plate number with the same sequence of letters and characters. Format-preserving encryption enables an encrypted data string to be stored in the same data field of a database as the original data string. Format-preserving encryption may be performed prior to embedding information in data strings via data string augmentation. Format-preserving encryption may also be performed together with data string augmentation. Unencrypted data strings are sometimes referred to as plaintext.

To support encryption and decryption operations in system 10, applications 16 may be provided with encryption and decryption engines (see, e.g., FIG. 1). For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of applications 16, may be provided as stand-alone applications that are invoked from within a calling application, or may be implemented using a distributed arrangement in which engine components are distributed across multiple applications and/or locations.

Figure 3:
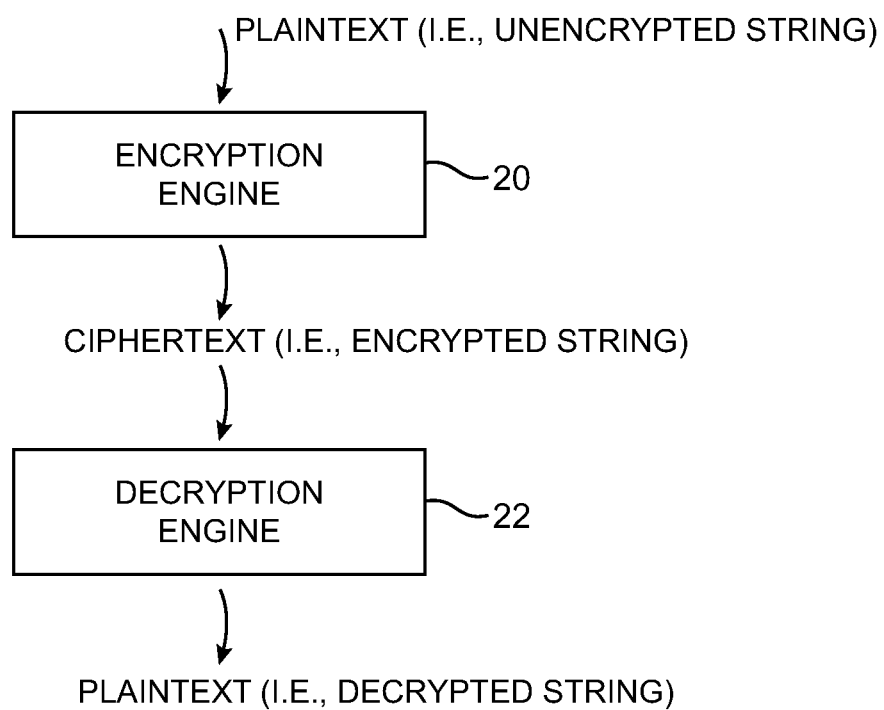
FIG. 3 is a diagram showing an encryption engine and a decryption engine in accordance with an embodiment of the present invention.

As shown in FIG. 3, during encryption operations, an encryption engine 20 encrypts unencrypted strings of characters (sometimes referred to as plaintext) into encrypted strings of characters (sometimes referred to as ciphertext). During decryption operations, a decryption engine 22 decrypts encrypted strings of characters to form unencrypted strings of characters.

Encryption and decryption engines in system 10 may be implemented using format-preserving cryptographic systems. These cryptographic engines are able to encrypt and decrypt strings without changing a string's format. The ability to preserve the format of a data string may greatly simplify system operations and may allow systems with legacy applications to be provided with cryptographic capabilities that would not be possible using conventional techniques. The ability to preserve a format of a data string may also allow encryption and decryption to be performed when embedding information in data strings.

Encryption engine 20 and decryption engine 22 may be called by an application or may be part of an application 16 that is running on data processing system 10. Encryption and decryption engines 20 and 22 may be part of an application 16 that performs data string augmentation. Encryption and decryption engines 20 and 22 may also be part of an application 16 that is different from an application 16 that performs data string augmentation. Data string augmentation may also be performed by encryption and decryption engines 20 and 22.

Figure 4:
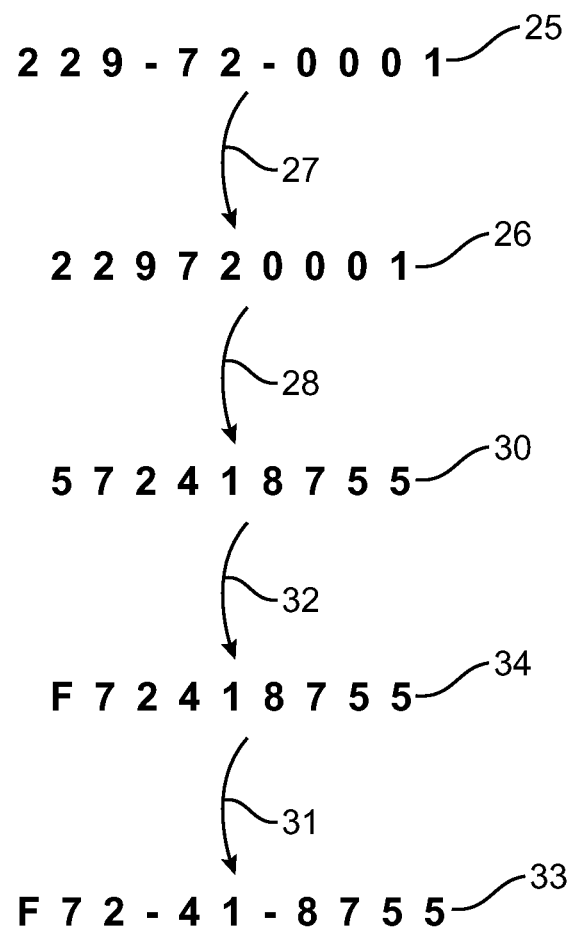
FIG. 4 is a diagram showing how information may be embedded in a data string by replacing one character of the string with a character that is not in an original character set for the string in accordance with an embodiment of the present invention.

An example of embedding information in a data string is shown in FIG. 4. Data string 25 may be data such a social security number. Data string 25 may have a data format that specifies the use of three numerical characters, a dash, two numerical characters, another dash, and four numerical characters. The data string may be processed in step 27 to remove extraneous character such as the two dashes. This produces string 26.

The character set used by data string 26 has only numerical characters 0-9. This character set may sometimes be referred to as the original character set of data string 26. Data string 26 may represented using a type of string that allows numerical characters, letter characters, and special characters. The original character set of data string 26 would then be a subset of a larger character set that is allowed by the string type.

If desired, an optional encryption operation or other transformation (step 28) may be performed on data string 26 to produce data string 30. If encryption is performed, format-preserving encryption can be used to produce an encrypted string 30 that has the same number of characters and that uses the same character set as the original data string 26. As shown in the example of FIG. 4, data string 30 has the same length (9 characters) and has the same character set (numerical characters 0-9) as data string 26. If encryption is not needed, steps 28 and 30 of FIG. 4 may be omitted.

In step 32, information is embedded in the data string to produce augmented string 34. In the example of FIG. 4, string 34 and string 30 differ by their first characters. The first character of string 30 is "5" whereas the first character of string 34 is "F." The character F is not in the original character set of string 26 but is in a larger character set that is allowed by the string type of the data string.

Figure 5:
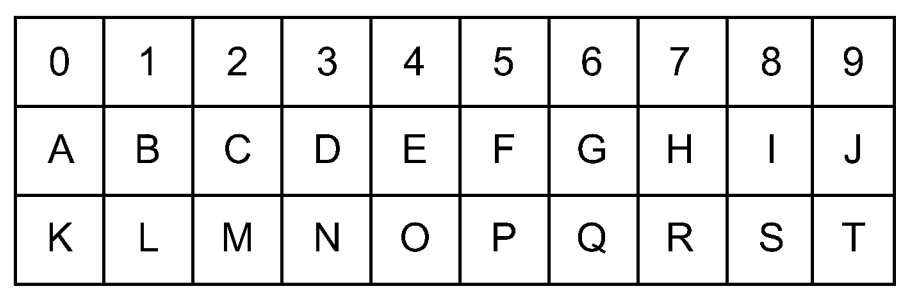

The letter character (i.e., "F" in this example) may serve to encode the embedded information. An example of a code that may be used is shown in FIG. 5. In the table of FIG. 5, the first row of numbers may be encoded into corresponding letters in either of the two corresponding rows of letters. For example, the number "5" may be encoded into "F" of the first row of letters or into "P" of the second row of letters. Whether "F" or "P" is chosen represents embedded information. For example, the embedded information may be information that has values of either 1 or 2. If the first character of augmented data string 34 of FIG. 3 is "F", this may represent embedded information with a value of 1. If the first character is "P," this may represent embedded information with a value of 2. Additionally, if the first character remains as "5," this may represent embedded information with a value of 0. In this manner, information may be embedded into a data string via data string augmentation. The code of FIG. 5 is merely an example. Any suitable scheme for encoding data may be used if desired.

If the encryption operation of steps 28 and 30 is omitted, information embedding may be performed directly on data string 26.

In step 31 of FIG. 4, the data string may be processed by inserting dashes to allow data string 33 to conform to the data format of data string 25.

In the example of FIG. 4, extraneous characters such as dashes are shown as being removed in step 27 prior to an encryption of step 28. If desired, format-preserving encryption may be performed directly on data string 25. Format-preserving encryption may encrypt a data string "229-72-0001" to produce an encrypted data string "572-41-8755" with the same format of numerical characters and dashes. The encrypted data string "572-41-8755" may then be processed to remove extraneous characters such as dashes, augmented with embedded information, then processed to insert dashes. Any suitable characters may be considered as extraneous characters. For example, spaces in a data string may be considered extraneous.

Encrypting and data string augmentation of FIG. 4 may be performed by the same application 16 (see, e.g., FIG. 1) or these operations may be performed by different applications 16. Encryption engine 20 (see, e.g., FIG. 3) may perform encryption step 28 of FIG. 4. Data string augmentation may also be performed by encryption engine 20 or data string augmentation may be performed by applications 16 that are separate from encryption engine 20. Encryption engine 20 may be located in application 16.

In the example of FIG. 4, embedded information can be extracted from augmented string 33 and the original social security number data string 25 can be produced by reversing the steps of FIG. 4.

Figure 6:
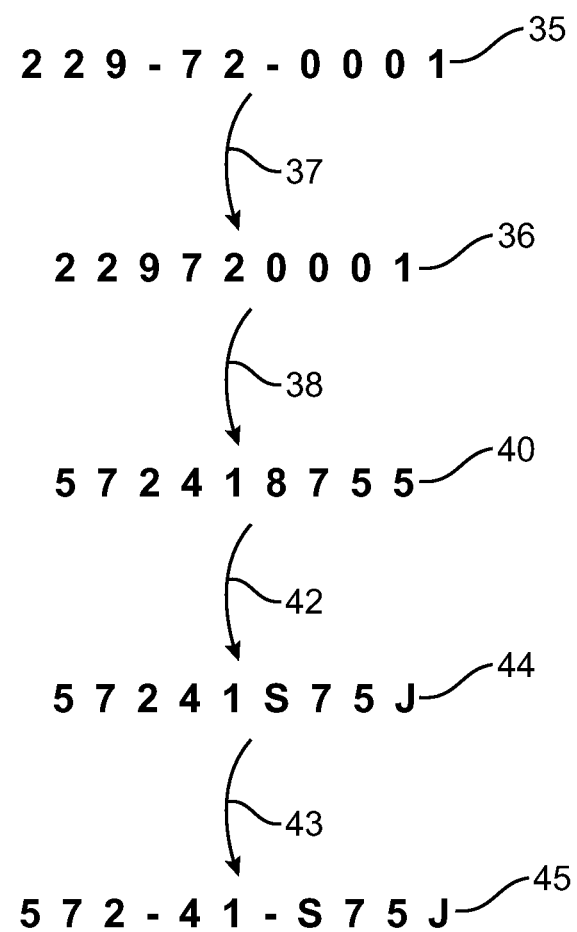
FIG. 6 is a diagram showing how information may be embedded in a data string by replacing more than one character of the string with a character that is not in an original character set for the string in accordance with an embodiment of the present invention.

FIG. 6 shows an example in which more than one character is used for embedding information. In FIG. 6, a data string such as a social security number data string 35 is first obtained. The data string may be processed in step 37 to remove extraneous characters such as dashes, thereby producing data string 36.

Data string 36 has an original character set of numerical characters 0-9. Data string 36 may be represented using a string type that permits letter characters in addition to numerical characters, or data string 36 may have a string type that allows letter characters and special characters in addition to numerical characters.

Data string 36 may be encrypted or otherwise transformed in step 38, producing data string 40. If encryption is performed in step 38, format-preserving encryption techniques may be used to preserve the number of characters and the original character set of data string 36.

Information may be embedded in the data string in step 42 via data string augmentation. The table of FIG. 5 or other suitable coding scheme may be used to encode the embedded information. Data string 40 ("57241875") may be augmented to produce augmented data string 44 ("57241S75J"). Using the table of FIG. 5, augmented string 44 in FIG. 6 could result from a code "000002001" that has been "added" to data string 40. The code of table of FIG. 5 is merely an example. Any suitable scheme for encoding information may be used.

In step 43 of FIG. 6, extraneous characters such as dashes or spaces may be added to augmented string 45 so that augmented string 45 conforms to the data format used for original string 35.

In the examples of FIGS. 4-6, data strings that have numerical characters are recoded in a larger set of characters that includes letters and numerical characters. If desired, information can also be embedded in data strings with other formats. For example, if a data string contains letter characters (e.g., a person's name), a larger character set of numbers, letters, and special characters could be used to embed information in the data string. A data string that uses a mixture of character sets, for example alternating letters and numbers, may also be augmented with embedded information.

Figure 7:
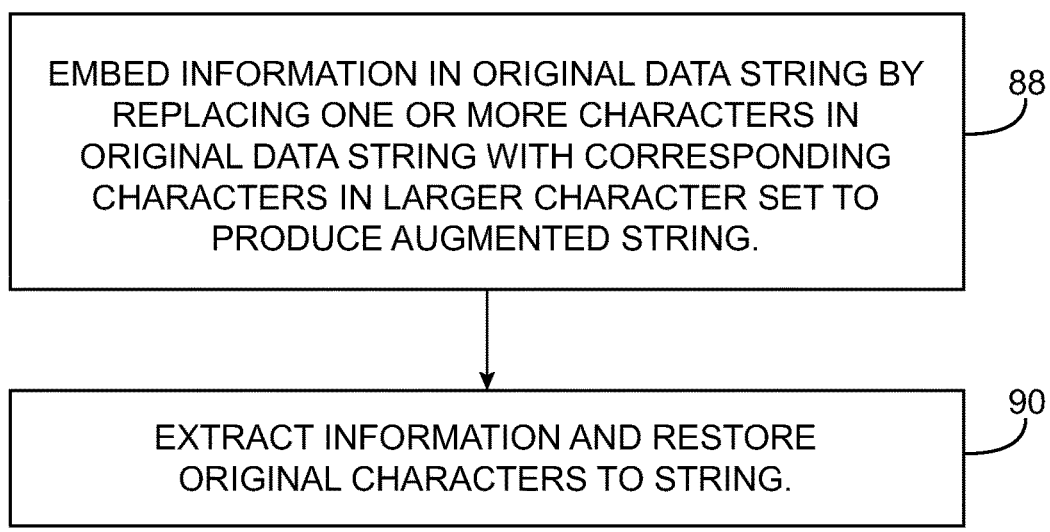
FIG. 7 is a flow chart of illustrative steps that may be used in embedding information in a data string by replacing data string characters with characters from a larger character set in accordance with an embodiment of the present invention

FIG. 7 is a flow chart of illustrative steps that may be used by computing equipment 12 in embedding information as with the examples of FIGS. 4-6. In step 88 of FIG. 7, information may be embedded in an original data string by replacing one or more of the characters in the original data string with corresponding characters in a larger character set. This produces an augmented string. Each of the original characters may map to one or more characters in the larger set, as described in connection with the illustrative coding scheme of FIG. 5. At least one of the original characters should generally map to two or more characters in the larger character set. Each of the characters in the larger character set may map to only one character in the original character set.

In step 90, the embedded information may be extracted and the string restored to its original character set by using the same character map that was used in step 88.

Figure 8:
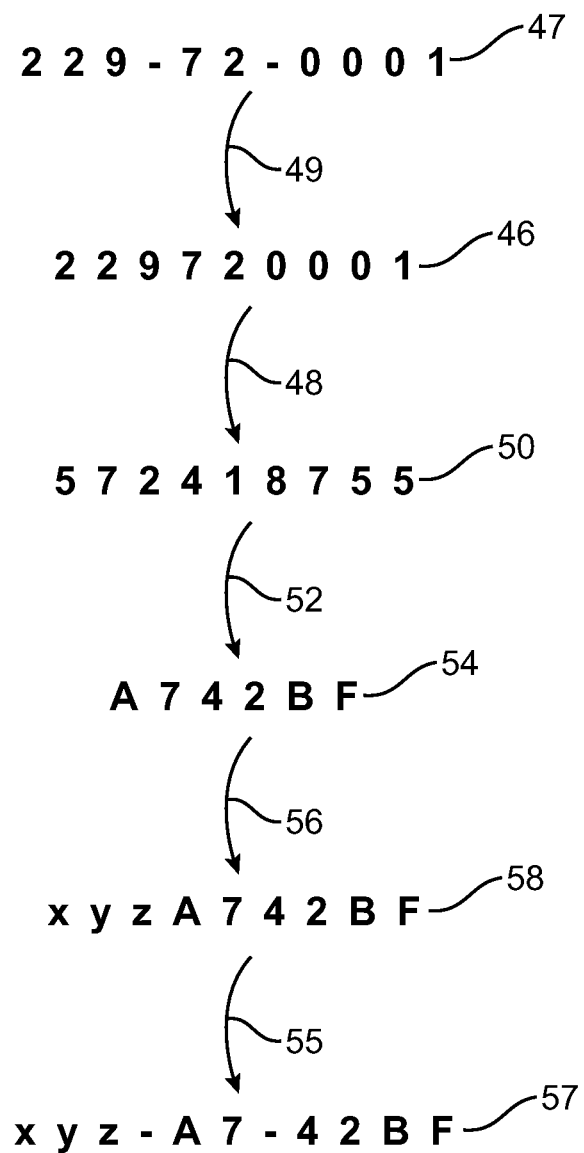
FIG. 8 is a diagram showing how information may be embedded in a data string by recoding a data string into a shortened data string in accordance with an embodiment of the present invention.

Another strategy for embedding information is shown in the example of FIG. 8. An original data string 47 may be processed in step 49 to remove extraneous characters such as dashes or spaces, producing data string 46. Data string 46 may be optionally encrypted or otherwise transformed in step 48 to produce data string 50. If step 48 is an encryption step, the encryption operation should use an encryption technique that preserves the character set of original data string 46.

Data string 50 uses a character set that has numerical characters 0-9. Data string 50 may therefore be said to be encoded with a base 10 character set. Data string 50 may be recoded into a higher base by using a larger character set. For example a larger character set that includes upper case letters and numbers will have 36 characters (10 numbers+26 letters). In step 52, data string 50 may be recoded into base 36 using this larger character set and may take the form of string 54. The characters of string 54 in FIG. 7 are therefore either letters or numbers.

Base 36 is used in this example, but other characters sets with different bases may also be used. For example, a character set may consist of only letters, or uppercase and lowercase letters, or letters and special characters, or other suitable character sets. As another example, base 34 may be used for a character set containing 10 numbers and 24 letters, in which letters "O" and "I" are omitted as they are easily mistaken for the numbers "0" and "1." Character sets of larger sizes will have larger bases.

The length of string 54 is six characters as compared to the nine characters of string 50. String 54 has therefore been "shortened" or "shrunk" by recoding in a character set that is larger than the original character set. If a base larger than base 36 is used, string 54 may be less than six characters in length. If a base smaller than base 36 is used, string 54 may be greater than six characters in length. Preferably, a character set and base should be chosen such that the length of string 54 is less than the length of string 50 as this provides space for embedding information in the string.

The encryption operation of step 48 may be length preserving so that encrypted data string 50 has the same length as data string 46. The encryption of step 48 may also produce an encrypted string that is longer than data string 46, as long as the recoding of step 52 produces a recoded data string 54 that is of appropriate length (e.g., a length that is shorter than data string 46).

The shrinking of data string 54 in FIG. 8 reduces the length of the string by three characters. In step 56, three characters of information may be embedded in the data string to produce data string 58. Data string 58 has the same length as original data string 46. Data string 58 has been augmented with characters "xyz" that represent embedded information. In the example of FIG. 8, the added characters "xyz" are shown in lower case, but the added characters could also be upper case letters, numbers, or any characters that are allowed by the data type of the data string. In this example, three characters are used to encode the embedded information. If a base other than base 36 is chosen in step 54, string 54 would typically be of a different length and fewer or more character spaces would be freed up for encoding embedded information.

The example of FIG. 8 involves a data string that has an original character set of numerical characters. Data strings with other character sets may also be augmented through a base conversion, if desired. For example, a data string with letter characters could be recoded in a larger character set of both letters and numbers.

Data strings that use more than one character set may also be augmented. For example, a license plate number may have a defined format such a number, followed by three letters, followed by three numbers ("5ANY728"). In such a case, the numerical characters are represented in base 10 whereas the letter characters are represented in base 26. Such a data string may be recoded using a higher base or a mixture of higher bases. For example, the data string may be recoded using a base 36 character set (letters and numbers) or a base 26 character set (letters), either of which would be larger than the mixture of base 26 and base 10 used in the original character set.

Figure 9:
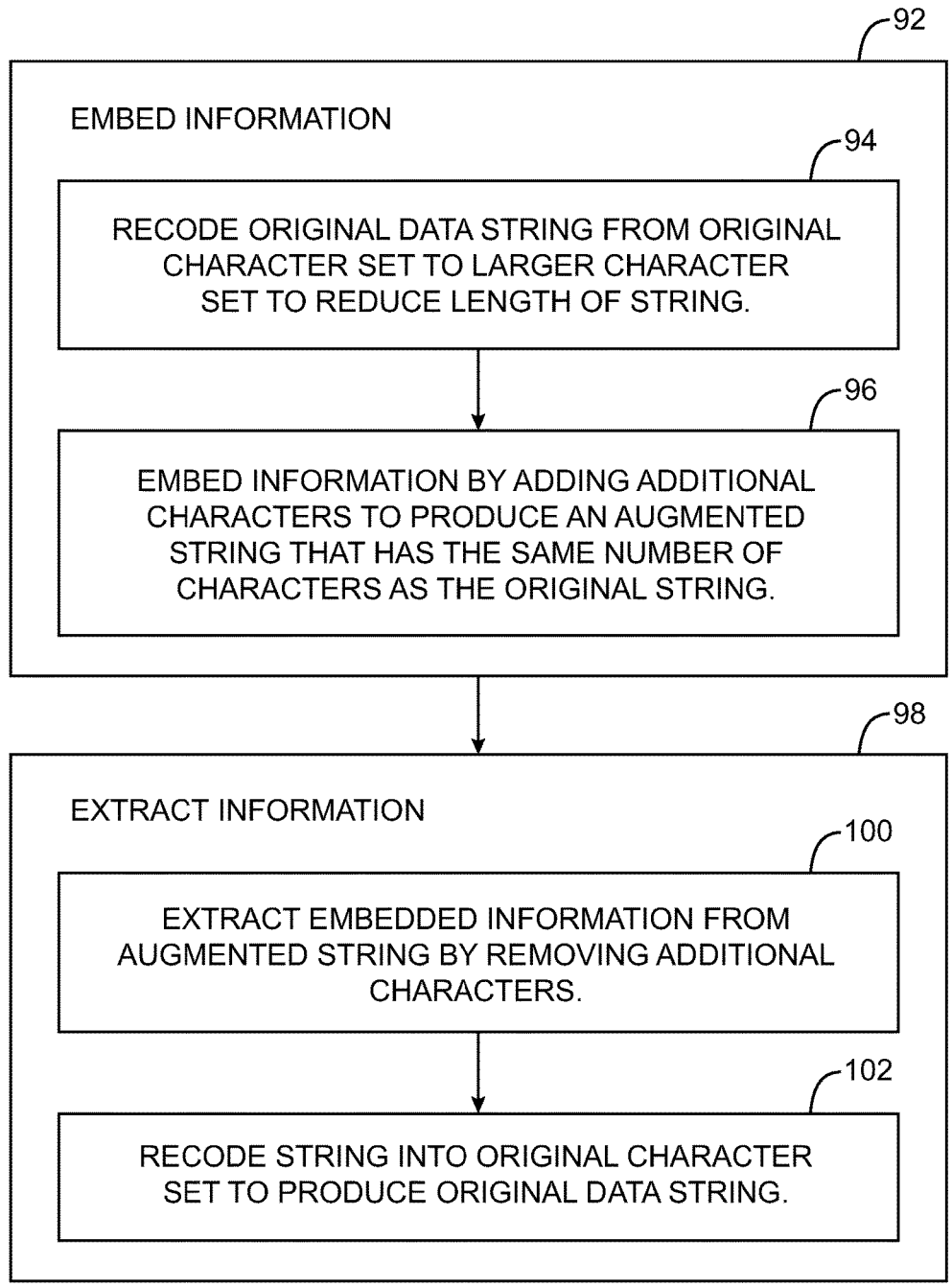
FIG. 9 is a flow chart of illustrative steps that may be used in embedding information in a data string by recoding a data string to form a shortened data string in accordance with an embodiment of the present invention.

FIG. 9 shows steps that may be used in embedding information as in the example of FIG. 8. Box 92 of FIG. 9 shows steps for embedding information via data string augmentation. In step 94, an original data string may be recoded from an original character set to a larger character set in order to reduce the length of the string. The recoding of the original data string is analogous to converting a number from a lower base to a higher base.

In step 96, information may be embedded by adding additional characters to produce an augmented string that has the same number of characters as the original string. Because the length of the string is unchanged and because the expanded character set can be handled by the applications in system 10, it is possible to embed information in the data string via data string augmentation without giving rise to significant incompatibilities.

Box 98 of FIG. 8 shows steps for extracting data from an augmented string. In step 100, embedded information may be extracted from the augmented string by removing the additional characters that were added in step 96.

In step 102, the string may be recoded into the original character set to produce the original data string. The recoding may be analogous to converting a number from a higher base to a lower base.

Figure 10:
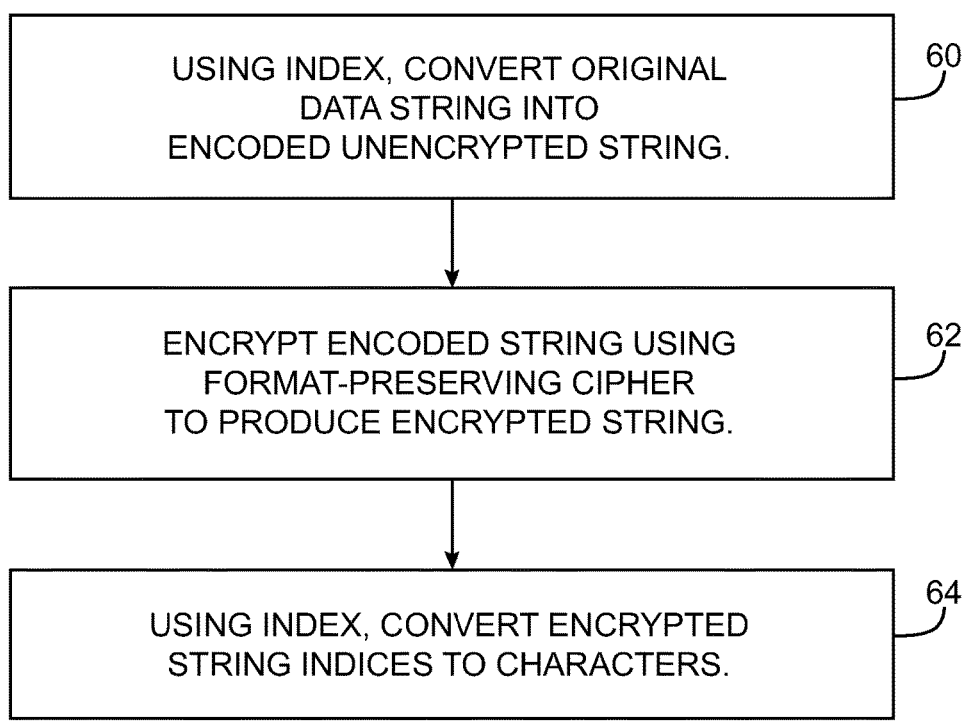
FIG. 10 is a flow chart of illustrative steps that may be used in format-preserving encryption in accordance with an embodiment of the present invention.

Encryption engine 20 (see, e.g., FIG. 3) may follow steps of the type shown outlined in FIG. 10 to perform format-preserving encryption.

The encryption and decryption engines 20 and 22 may use index mappings to relate possible character values in a given string position to corresponding index values in an index. By mapping string characters to and from a corresponding index, the encryption and decryption engines 20 and 22 are able to perform encryption and decryption while preserving string formatting.

At step 60 of FIG. 10, for each character in the string, an index mapping is created by defining a set of legal character values and a corresponding index of sequential values that is associated with the legal characters values. For example, if the legal characters for a particular character position in a string include the 10 digits (0 . . . 9) and the 26 lowercase letters (a . . . z), a suitable indexing scheme associates digits 0 through 9 with index values 1 through 10 and associates letters a through z with index values 11-36. In this index mapping, the index values that are created are all adjacent. Because there are no gaps in the indices, index value 10 is adjacent to index value 11 (in the present example). The index may be used, for example, to encode a data string into a decimal or hex (base 16) number, so that each possible data string corresponds to a unique number. The string that results from such an indexing scheme is sometimes called an encoded string. If the string contains more than one type of character, there will be more than one index mapping associated with the characters in the string.

At step 62, the encryption engine 20 encrypts the encoded string using a format-preserving cipher. Any suitable cryptographic formulation may be used, provided that the cryptographic strength of the encryption algorithm is sufficiently strong. With one suitable approach, encryption engine 20 and decryption engine 22 use a cryptographic algorithm based on the well known Feistel construction. The Feistel construction uses pseudo-random functions to produce a pseudo-random permutation (also sometimes referred to as a cipher or a block cipher). The Feistel construction may use one or more cryptographic keys.

At step 64, the same index mappings that were used during the encoding operations of step 60 are used to convert the index values of the encrypted string back into characters. Decoding the encoded version of the string using the index mappings returns the string to its original character set.

Figure 11:
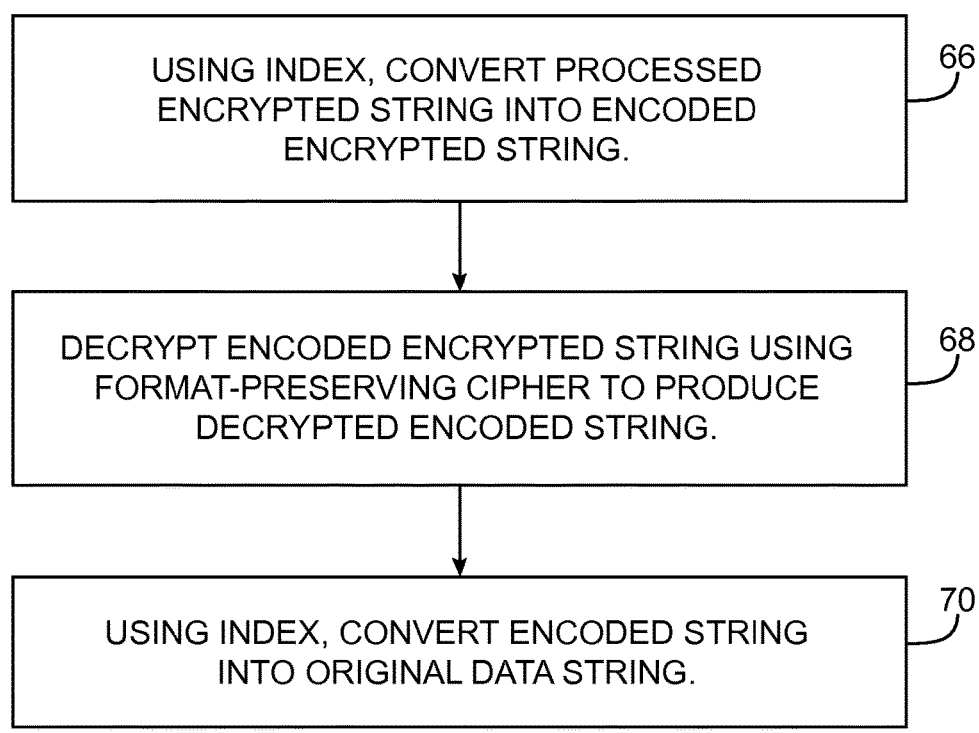
FIG. 11 is a flow chart of illustrative steps that may be used in performing format-preserving decryption in accordance with an embodiment of the present invention.

Illustrative steps involved in using decryption engine 22 to decrypt a string that has been encrypted using the process of FIG. 10 are shown in FIG. 11. The decryption engine 22 may be invoked by an application 16 or may be part of an application 16 that is running on the computing equipment of data processing system 10.

At step 66, the decryption engine 20 uses the index mappings that were used during the encryption operations of FIG. 10 to convert the each of the characters of the processed encrypted string (i.e., the encrypted string from which the extraneous characters have been removed) into an encoded encrypted string. If, as an example, the legal set of characters associated with the first character of the encrypted string is defined as the set of 10 digits, a 10 digit index may be used to encode the first character of the encrypted string. If the legal set of characters associated with the second character of the encrypted string is defined as the set of 26 uppercase letters, a 26-digit index may be used to encode the second character of the encrypted string. During step 66, each character of the string is converted to a corresponding index value using an appropriate index mapping. The encoded string may be a decimal or hex number.

At step 68, the encoded version of the encrypted string is decrypted. The decryption engine 22 decrypts the string using the format-preserving cipher that was used in step 62 of FIG. 8. For example, the decryption engine 20 may perform Feistel construction decryption operations.

At step 70, the index mappings that were used during the encoding operations of step 66 are used to convert the index values of the decrypted string back into their associated characters (i.e., characters in the legal set of character values that were defined for each character position at step 54). This returns the decrypted string to its original character set. In strings that contain more than one different type of character, multiple different index mappings are used.

By incorporating format-preserving encryption and decryption engines 20 and 22 into data processing system 10, legacy applications and databases and other applications and databases can be provided with cryptographic capabilities without disrupting their normal operation.

Figure 12:
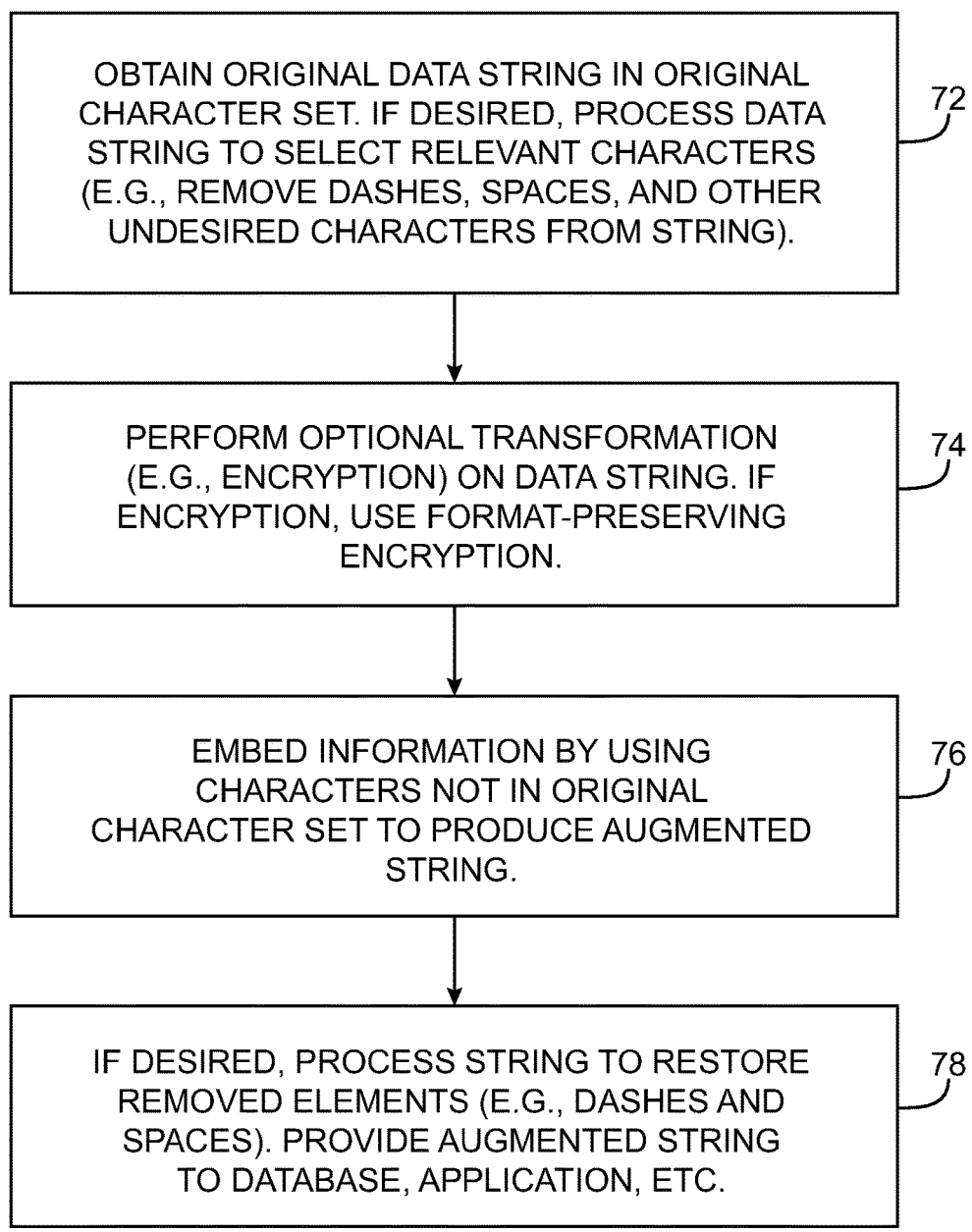
FIG. 12 is a flow chart of illustrative steps that may be used in encrypting and embedding information in a data string in accordance with an embodiment of the present invention.

FIG. 12 shows steps that may be used in encrypting and embedding information in data strings.

Data strings may be strings that are retrieved from and stored in fields in a database 18 (e.g., a table of the type shown in FIG. 2)

In step 72, a data string is obtained. If desired, the data string may be processed to select relevant characters. For example, if the string is a social security number that contains nine digits separated by two dashes, the string can be processed to remove the dashes.

As another example, if the string being processed is a credit card number containing 16 digits and three spaces, the spaces can be removed.

At step 74, an optional transformation such as an encryption operation may be performed as described in connection with FIG. 11.

At step 76, information may be embedded by using characters that are not in the original character set to produce an augmented string. Information embedding operations may be performed as described in connection with step 88 of FIG. 7. Embedding operations may also be performed as described in connection with step 92 of FIG. 9.

At step 78 of FIG. 12, the augmented string may be processed to restore elements such as dashes and spaces that were removed at step 72. The augmented string may be provided to an application 16 and stored in database 18 (as an example). Legacy applications and databases that require a specific string format will be able to accept the augmented string.

Figure 13:
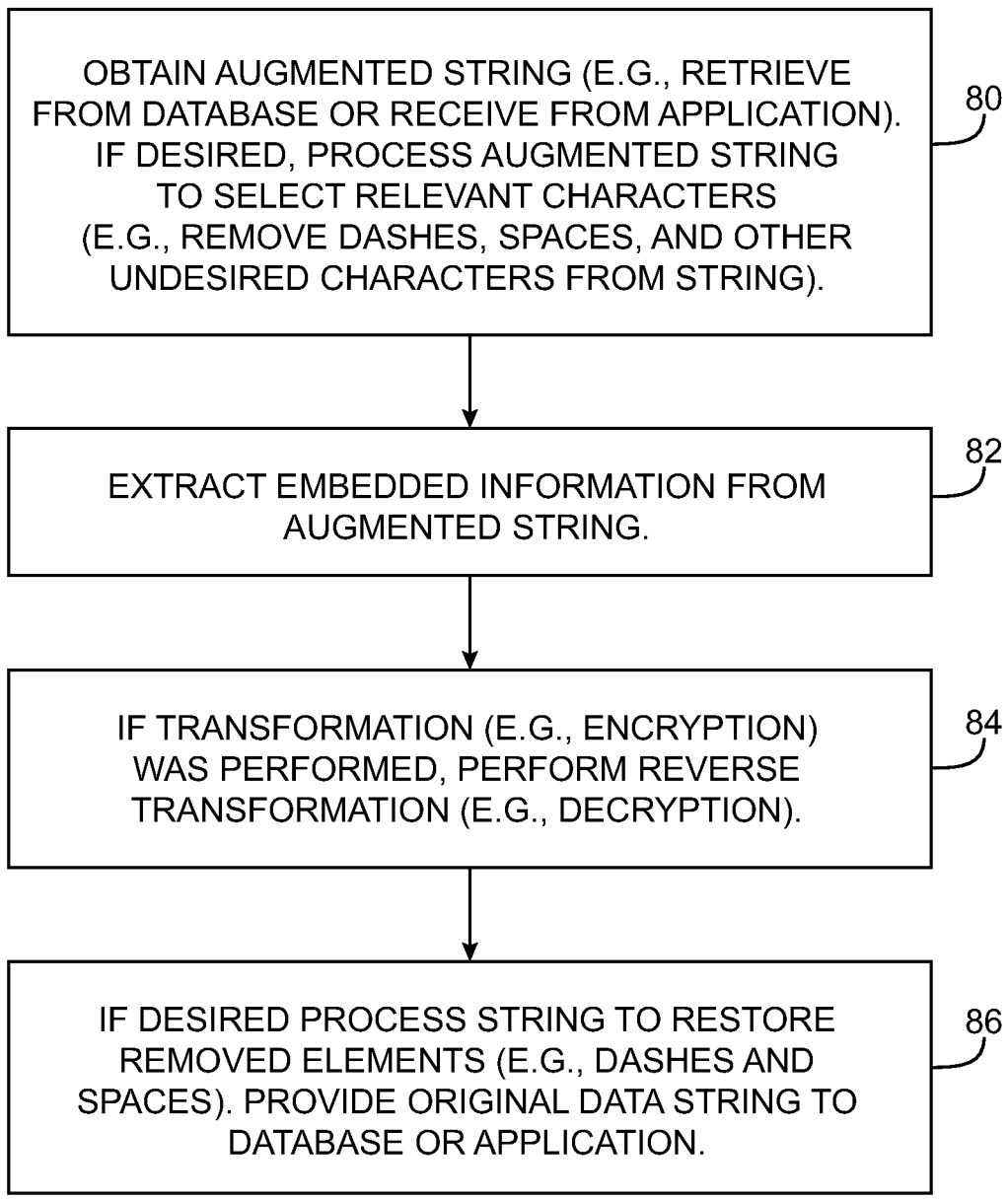
FIG. 13 is a flow chart of illustrative steps that may be used in decrypting and extracting information from a data string in accordance with an embodiment of the present invention.

FIG. 13 shows steps that may be used to decrypt and extract embedded data from an augmented string.

At step 80, the decryption engine obtains the augmented string. The encrypted string may be retrieved from a database 18 or received from an application 16. During step 80, the encrypted string is processed to identify relevant characters. During step 80, dashes, spaces, and other extraneous elements can also be removed from the string. The relevant characters in the string are retained. The process of removing extraneous characters during step 80 is the same as that used during the processing of the original string that was performed during step 72 of FIG. 10. If the string being decrypted is a social security number that contains nine digits separated by two dashes, the encrypted string can be processed to remove the dashes.

At step 82, embedded information may be extracted from the augmented string. Extracting operations may be performed as described in connection with step 90 of FIG. 7. Extracting operations may also be performed as described in connection with step 98 of FIG. 9.

At step 84 of FIG. 13, a reverse transformation (e.g., decryption) may be performed that is a reverse of the transformation performed in step 74 of FIG. 12.

At step 86 of FIG. 13, the decoded decrypted string is processed to restore elements such as dashes and spaces that were removed at step 80. This restores the string to its original state (i.e., the state of the string when obtained at step 72 of FIG. 12). The original string may then be provided to an application 16 or database 18.

Cryptographic keys that are used in the encrypting step 62 of FIG. 10 may need to be periodically updated. For example, a government regulation or standard might require that each year a new key be used for encrypting data. In the first year that encryption is performed, a key "key-0" may be used. In the following year, the key may be updated to "key-1." At this point, any data that is decrypted (using key-0) may be re-encrypted for database storage using key-1. At any given time after the first year, a database may have data strings that are encrypted using keys from more than one year. In order to decrypt such data strings, the version numbers of the keys must be known. The key version numbers may be embedded into the encrypted data strings in step 76 of FIG. 12, obviating the need to retrofit existing systems.

In the example of FIG. 8, string 57, shown as "xyz-A7-42BF," may have a form such as "001-A7-42BF" when associated with a key of version 1. String 57 may have a form such as "029-A7-42BF" for a key of version 29. Alternatively, if base 36 (i.e. corresponding to a character set of 26 letters and 10 numbers) is used for counting key versions, key version 29 may correspond to "T" and key version 4,852 may correspond to "3LN", such that string 57 for key version 4,852 may have the form "3LN-A7-42BF".

Any base (e.g., base 10, base 26, base 24, base 36, etc.) may be used to encode the key version.

Figure 14:
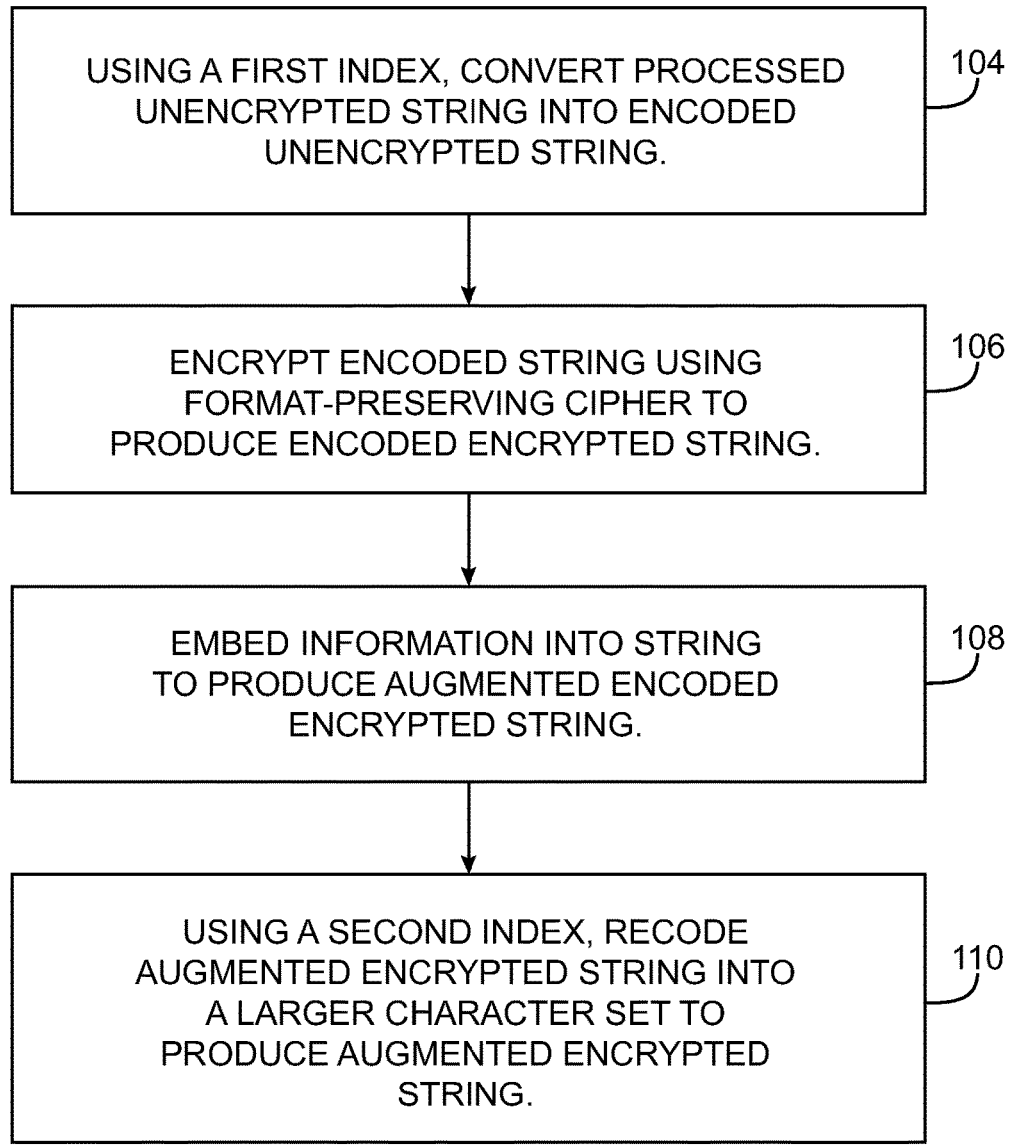
FIG. 14 is a flow chart of illustrative steps that may be used in encrypting and embedding information in an encoded data string in accordance with an embodiment of the present invention.

Information embedding operations may also be performed when a data string is in an encoded form. FIG. 14 shows steps that may be used in embedding information in a string while it is in an encoded form.

In step 104 of FIG. 14, an index may be used such as the index of step 60 of FIG. 10. The index may be used to convert a data string into an encoded string. The encoded string may be a hex number. There may be a one-to-one correspondence between data strings and hex numbers, such that data strings correspond to sequential hex numbers.

In step 106 of FIG. 14, a format-preserving cipher may be used to encrypt the encoded string. The encryption may be performed as described in step 62 of FIG. 10.

In step 108 of FIG. 14, information may be embedded into the encrypted string while it is in encoded form to produce an augmented string.

As an example of how information may be embedded in an encoded string, consider a data string that is a nine digit social security number. Such a data string has an original data set of numerical characters (base 10). The largest value of a nine-digit base-10 number is 999,999,999, which corresponds to 3B9AC9FF (hex) when converted to hex (base 16). Consider a larger character set containing 10 numbers and 26 letters and having base 36. The maximum value of a data string with nine characters in base 36 would correspond to 5C5E4523FFFF (hex).

A nine-digit social security number that is converted to hex and encrypted with a format-preserving cipher, might have a value of 2A94C508 (hex), for example. Four zeros may be added to the hex number to produce 2A94C5080000 (hex). This is still a valid number as it is smaller than the maximum number in the larger character set (i.e., it is smaller than 5C5E4523FFFF). The four characters at the end of 2A94C5080000 (hex) may then be used to encode embedded information. For key 27 (key 1B in hex), an augmented string in this example might be 2A94C508001B (hex).

In step 110 of FIG. 14, an index may be used to decode the encoded encrypted data string into the larger character set (i.e. letters and numbers in the example). The index that is used in step 110 will be different than the index in step 104, as different character sets are used.

Steps 104, 106, 108, and 110 of FIG. 14 may be used in place of steps 74 and 76 of FIG. 12. If only information embedding is required, the encryption step of step 106 may be omitted.

The foregoing is merely illustrative of the principles of this invention and various modifications can be made by those skilled in the art without departing from the scope and spirit of the invention.

What is claimed is:

1. A computer-implemented method for encrypting and embedding information in a data string containing characters in a first set of characters with a first base, the method comprising:

encoding, by computing equipment, the data string using at least a first index of index values to generate an encoded data string containing characters in a second set of characters with a second base, wherein the first index of index values comprises a first index of sequential index values, each of which corresponds to a respective one of the characters in the first set of characters;

encrypting, by the computing equipment, the encoded data string using a format preserving encryption to generate an encrypted encoded data string;

embedding, by the computing equipment, information in the encrypted encoded data string to generate an augmented encrypted encoded data string; and converting, using at least a second index of index values, the augmented encrypted encoded data string to generate an augmented encrypted data string that contains characters in a third set of characters with a third base that is larger than the second base, the third set of characters having a greater number of characters than the first set of characters, wherein the second index of index values is different from the first index of index values, wherein the format preserving encryption uses a cryptographic key to encrypt the encoded data string, and wherein the information that is embedded comprises information about the cryptographic key.

2. The method defined in claim 1, wherein the information that is embedded comprises information associated with regulation of the cryptographic key.

3. The method defined in claim 2, wherein the information that is embedded comprises information associated with a government regulation of the cryptographic key.

4. The method defined in claim 1, wherein the second index of index values comprises a second index of sequential index values, each of which corresponds to a respective one of the characters in the second set of characters.

5. The method defined in claim 1, wherein the first set of characters includes only numerical characters.

6. The method defined in claim 5, wherein the second set of characters includes numerical characters and letter characters.

7. The method defined in claim 6, wherein the information that is embedded comprises a key version number for the cryptographic key.

8. The method defined in claim 7, wherein the second set of characters includes only numerical characters and letter characters.

9. The method defined in claim 1, wherein the encoded data string is a hex number.

10. The method defined in claim 1, wherein the first set of characters is a subset of the second set of characters.

11. The method defined in claim 1, wherein the second set of characters is a set of characters specified by a data type of the data string.

12. A computer-implemented method for encrypting and embedding information in a data string containing characters in a first set of characters with a first base, comprising:

encoding, by a computing device, the data string using a first index to produce an encoded data string containing characters in a second set of characters with a second base, wherein the first index comprises sequential index values, each of which corresponds to a respective one of the characters in the first set of characters;

encrypting, by the computing device, the encoded data string using a format-preserving encryption to produce an encrypted encoded data string that has a first length;

embedding, by the computing device, information in the encrypted encoded data string to produce an augmented encrypted encoded data string, wherein the augmented encrypted encoded data string has a second length greater than equal to the first length; and converting, using a second index, the augmented encrypted encoded data string to produce an augmented encrypted data string that contains characters in a third set of characters with a third base, wherein the third base is larger than the second base, wherein the third set of characters has a greater number of characters than the first set of characters, wherein encrypting the data string comprises encrypting the encoded data string using a format-preserving cipher, wherein the format-preserving encryption uses a cryptographic key, wherein the information that is embedded comprises information associated with regulation of the cryptographic key, and wherein a difference between the first and second lengths is determined based on a difference in size between the first index and the second index.

13. The method defined in claim 12, further comprising:
prior to encoding the data string, processing the data string with the computing device to remove extraneous characters from the data string.

14. The method defined in claim 12, wherein the second base is larger than the first base.

15. A computer-implemented method for encrypting and embedding information in a data string containing characters in a first set of characters having a first base, comprising:

encoding, by a computing device, the data string using a first index to produce an encoded data string containing characters in a second set of characters having a second base, wherein the first index comprises sequential index values, each of which corresponds to a respective one of the characters in the first set of characters;

encrypting, by the computing device, the encoded data string using a format-preserving cipher to produce an encrypted encoded data string;

embedding, by the computing device, information in the encrypted encoded data string to produce an augmented encrypted encoded data string, wherein the augmented encrypted encoded data string includes first and second portions, wherein the encrypted encoded data string is located in the first portion, and wherein the information is located in the second portion; and converting, using a second index, the augmented encrypted encoded data string to produce an augmented encrypted data string that contains characters in a third set of characters having a third base, wherein the third base is larger than the second base, wherein the second set of characters has a greater number of characters than the first set of characters, wherein the format-preserving cipher uses a cryptographic key, wherein the information that is embedded comprises information about the cryptographic key, and wherein a length of the second portion of the augmented encrypted encoded data string is determined based on a difference in size between the first index and the second index.

16. The method defined in claim 15, further comprising:
prior to encoding the data string, processing the data string with the computing device to remove extraneous characters from the data string, wherein the processed data string contains characters from the first set of characters.

17. The method defined in claim 15, wherein the augmented encrypted data string is of equal length to the data string containing characters in the first set of characters.

18. The method defined in claim 1, wherein embedding the information comprises:
adding a number of additional characters to the encrypted encoded data string, wherein the number of added additional characters is determined based on the second index and a length of the data string containing the characters in the first set of characters.

* * * * *